United States Patent
Schunk

(10) Patent No.: US 6,694,074 B2
(45) Date of Patent: Feb. 17, 2004

(54) TRANSMISSION AND RECEPTION CONFIGURATION FOR BI-DIRECTIONAL OPTICAL DATA TRANSMISSION

(75) Inventor: Nikolaus Schunk, Hildesheim (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/013,279

(22) Filed: Dec. 10, 2001

(65) Prior Publication Data
US 2003/0053769 A1 Mar. 20, 2003

Related U.S. Application Data

(63) Continuation of application No. PCT/DE01/03605, filed on Sep. 14, 2001.

(51) Int. Cl.[7] .................................................. G02B 6/32
(52) U.S. Cl. ........................... 385/33; 385/33; 385/39; 385/49; 385/88; 385/93; 398/140; 398/141
(58) Field of Search ................ 385/31, 33, 39, 385/49, 88, 93; 359/154, 193; 398/140, 141

(56) References Cited

U.S. PATENT DOCUMENTS

| 5,278,929 A | | 1/1994 | Tanisawa et al. ............. 385/93 |
| 5,546,212 A | * | 8/1996 | Kunikane et al. ............ 359/163 |
| 5,552,918 A | * | 9/1996 | Krug et al. .................. 359/152 |
| 5,555,334 A | * | 9/1996 | Ohnishi et al. ................ 385/93 |
| 5,566,265 A | * | 10/1996 | Spaeth et al. .................. 385/93 |
| 5,721,426 A | * | 2/1998 | Sakai et al. ............. 250/227.11 |
| 5,997,185 A | * | 12/1999 | Kropp .......................... 385/89 |
| 6,188,495 B1 | * | 2/2001 | Inoue et al. ................. 359/152 |
| 6,243,508 B1 | * | 6/2001 | Jewell et al. .................. 385/14 |
| 6,252,725 B1 | * | 6/2001 | Tran et al. .................... 359/811 |
| 6,353,491 B1 | * | 3/2002 | Tanaka et al. ............... 359/152 |
| 6,453,091 B2 | * | 9/2002 | Kawai .......................... 385/33 |
| 6,454,467 B1 | * | 9/2002 | Ishihara et al. ................ 385/88 |
| 2002/0041731 A1 | * | 4/2002 | Fujita et al. ................... 385/31 |
| 2002/0102084 A1 | | 8/2002 | Srikant ........................ 385/124 |

FOREIGN PATENT DOCUMENTS

| DE | 37 16 772 A1 | 12/1988 | ............ G02B/6/42 |
| DE | 198 34 090 A1 | 2/2000 | ............ G02B/6/42 |
| EP | 0 844 503 A1 | 5/1998 | ............ G02B/6/42 |
| EP | 0 887 674 A2 | 12/1998 | ............ G02B/6/42 |
| JP | 63 024 206 | 2/1988 | ............ G02B/6/42 |
| JP | 2001188149 A | * 7/2001 | ............ G02B/6/42 |

* cited by examiner

Primary Examiner—Brian Healy
Assistant Examiner—Daniel J Petkovsek
(74) Attorney, Agent, or Firm—Laurence A. Greenberg; Werner H. Stemer; Ralph E. Locher

(57) ABSTRACT

A transmission and reception configuration for bi-directional optical data transmission, in particular, through plastic-fiber optical waveguides, includes a transmitter and a receiver, a coupling lens projecting light, delivered through an optical waveguide, onto the receiver, and a micro-lens, mounted on the transmitter, which focuses forward emitted light of the transmitter and projects it onto an edge region of the coupling lens, from which it is injected into the optical waveguide. The receiver and the transmitter are disposed next to one another on a substrate.

26 Claims, 5 Drawing Sheets

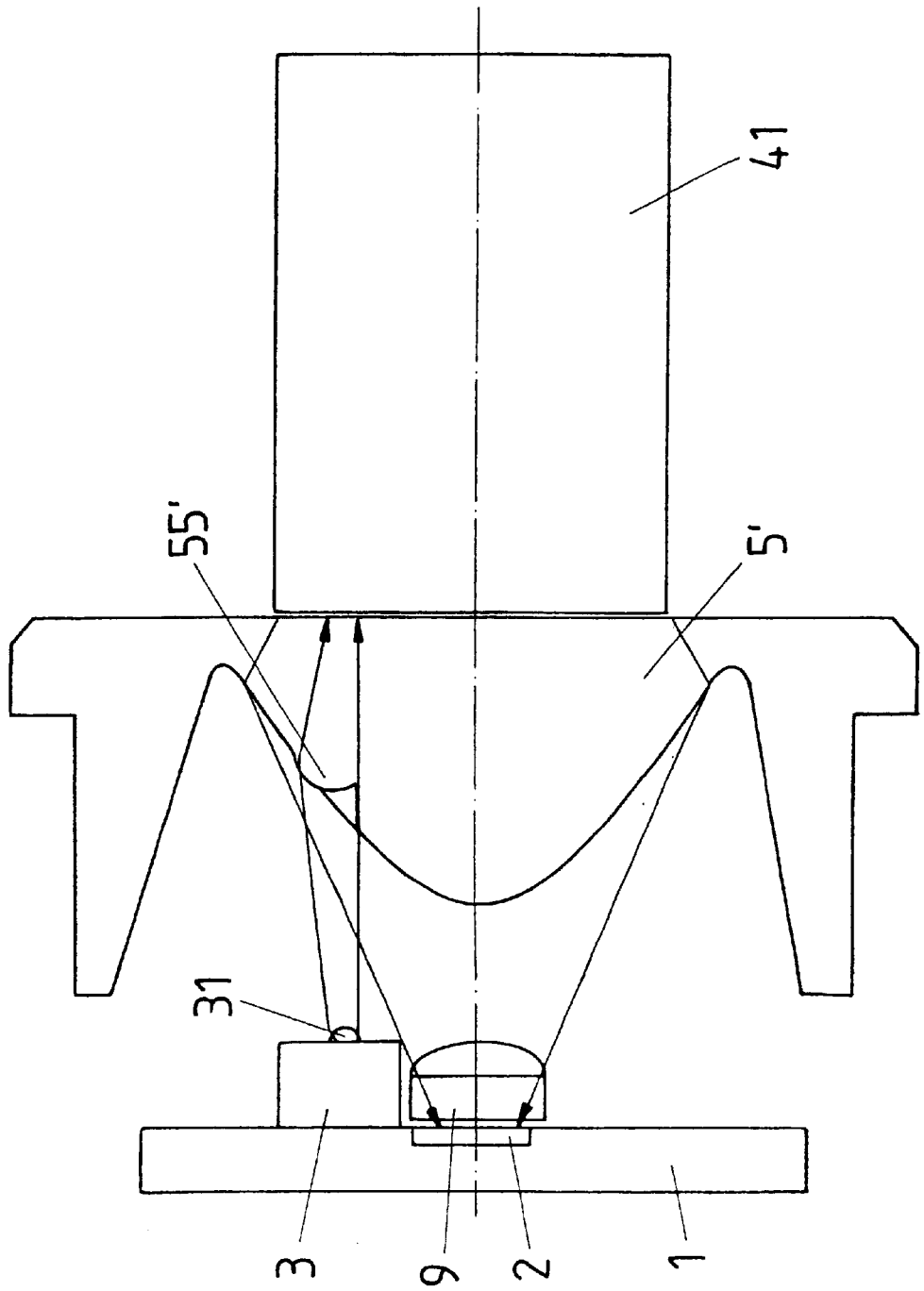

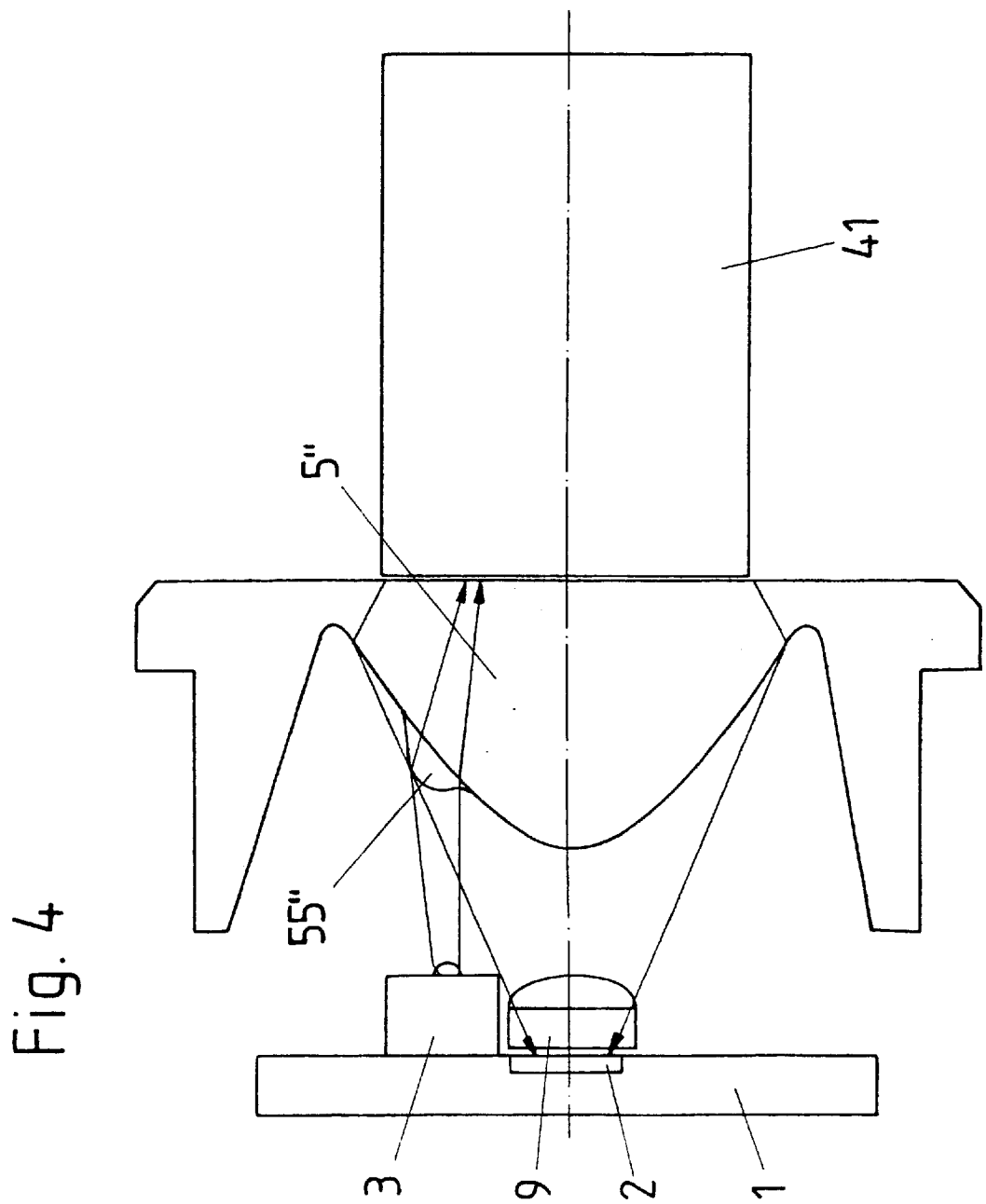

TRANSMISSION AND RECEPTION CONFIGURATION FOR BI-DIRECTIONAL OPTICAL DATA TRANSMISSION

CROSS-REFERENCE TO RELATED APPLICATION

This application is a continuation of copending International Application No. PCT/DE01/03605, filed Sep. 14, 2001, which designated the United States.

BACKGROUND OF THE INVENTION

Field of the Invention

The invention relates to a transmission and reception configuration for bi-directional optical data transmission, in particular, through plastic-fiber optical waveguides, having a transmission element and a reception element. Its preferred field of use concerns the bi-directional transmission of data through plastic fibers or polymer fibers (POF fibers).

In the prior art, bi-directional optical transmission paths are produced in full-duplex operation using two separate transmission fibers. For considerations of space and weight and to minimize the number of parts required, however, it is expedient that the data to be transmitted should use only one transmission fiber in both transmission directions. Such a configuration requires transmission and reception configurations for bi-directional optical data transmission that, on one hand, inject the optical power (otherwise referred to as an optical signal or as light) emitted by a transmission element into the transmission fiber and, on the other hand, extract the light emitted by another transmission unit from the transmission fiber, and detect it by using a reception element.

Also in the prior art, bi-directional transmission and reception configurations are used in which the transmission element is disposed in front of the reception element, and the reception diode is covered with a transmission filter that is transparent only for the reception wavelength. Electrical crosstalk between the transmission element and the reception element is, in such a case, substantially prevented by spatial separation of the two elements.

Other prior art bi-directional fiber transmission systems have the light emitted by a laser diode be linearly polarized along an axis. A polarizer in front of the photodiode suppresses optical near-end crosstalk. A disadvantage of such a system is that the reception power is also lost in the polarization direction, so that, on average, only half the reception power is detected. Far-end crosstalk is restricted by not allowing any jack connectors to be installed along the optical path and by reducing the terminal reflection in combination with the fiber attenuation in the backward direction to the extent that a sufficient detection-threshold noise ratio is provided. A disadvantage of the reception element in such a case is that it is not configured for the minimum possible reception power.

SUMMARY OF THE INVENTION

It is accordingly an object of the invention to provide a transmission and reception configuration for bi-directional optical data transmission that overcomes the hereinafore-mentioned disadvantages of the heretofore-known devices of this general type and that avoids the aforementioned disadvantages of the prior art and, in particular, allows a transmission element (transmitter) and a reception element (receiver) to be disposed next to one another on a substrate.

With the foregoing and other objects in view, there is provided, in accordance with the invention, a transmission and reception configuration for bi-directional optical data transmission, including a substrate, a transmitter for emitting light, disposed on the substrate, a receiver for receiving light, the receiver disposed next to the transmitter on the substrate, a coupling lens for projecting optical received light delivered from an optical waveguide onto the receiver, the coupling lens optically coupled to the receiver and having an edge region, and a micro-lens focusing forward-emitted light of the transmitter and projecting the light onto the edge region, the micro-lens connected to the transmitter, the light being injected from the edge region into the optical waveguide. Preferably, the bi-directional optical data transmission is through plastic-fiber optical waveguides.

Correspondingly, the solution according to the invention is distinguished by the fact that, on one hand, a coupling lens is provided that projects optical light received, delivered through an optical waveguide, onto the receiver. On the other hand, a micro-lens is mounted on the transmitter. The micro-lens focuses forward the emitted light of the transmitter and projects it onto an edge region of the coupling lens, from which it is injected into the optical waveguide.

Hence, the solution according to the invention proposes that the light emitted by the transmitter be projected by using a micro-lens that is located on the transmitter onto an edge region of the coupling lens while the reception power is projected onto the receiver by the coupling lens. As such, the transmission and reception powers are separated despite the fact that the transmission and receivers are disposed next to one another on a substrate. Thus, the solution according to the invention provides a structure of a transmission and reception configuration, in which the transmission and receivers can be disposed next to one another on a substrate.

The configuration permits simpler and more cost-effective manufacture of the transmission and reception configuration.

In accordance with another feature of the invention, the receiver is adjacent the transmitter on the substrate.

In accordance with a further feature of the invention, the receiver has a diameter that is less than the fiber-core diameter of the coupled optical waveguide. The diameter of the receiver, which is, in particular, a photodiode, is preferably in the region of half the fiber-core diameter or less. Such a configuration has the advantage that the photodiode capacitance is small and, in combination with a high transimpedance of a preamplifier, high receiver sensitivity is achieved.

Next to the receiver, the transmitter is mounted a small distance away on the substrate. As such, the receiver and the transmitter preferably lie within the projected cross-sectional area of the fiber core of the coupled optical waveguide. The configuration guarantees a high coupling factor when injecting and extracting transmission and reception powers, respectively, into and from the fiber core.

In accordance with an added feature of the invention, the coupling lens is an aspherical lens, i.e., a lens whose lens surface is aspherically curved. The coupling lens is ground flat on its side facing away from the transmission and receivers, so that an optical waveguide with its end surface can be coupled directly to the coupling lens. The use of an aspherical lens has the advantage that divergent light emerging from the fiber core of the optical waveguide, even in the edge regions, can be projected onto the receiver.

In accordance with an additional feature of the invention, the micro-lens disposed on the transmitter has an aspherical curvature so that the emitted light can be projected onto a limited edge region of the preferably aspherical coupling lens.

In accordance with yet another feature of the invention, the coupling lens is bi-focally configured, with the coupling lens forming a second lens in the injection region of the optical power of the transmitter. The configuration maximizes the injection of the transmission power into the fiber. The coupling lens is correspondingly constructed such that it primarily focuses the optical received light onto the receiver and, in a small edge region, injects the transmission power of the transmitter maximally into the fiber.

In accordance with yet a further feature of the invention, the coupling lens forms a short waveguide appendage that extends in the direction of or towards the transmitter. The waveguide appendage is preferably provided with a converging lens on its end. Because of the short distance between the transmitter with the micro-lens and the waveguide appendage, coupling losses can be kept extremely low in such an embodiment.

In accordance with yet an added feature of the invention, there is provided a transmission filter disposed at the receiver, the transmission filter being non-transparent to light of a given wavelength. In other words, the transmission filter can be disposed upstream of the receiver with respect to a receiving direction of the receiver or in front of the receiver.

If different wavelengths are used for the bi-directional optical data transmission, undesired reflection of the transmission power from the end surfaces of the lenses and from the end surface of the optical fiber will preferably be kept away from the receiver by a color transmission filter, which is optically transparent with respect to the reception wavelength. The transmission filter is, in such a case, disposed over the receiver. By using a transmission filter, noise signals can be suppressed to the extent that there is no effect on the bit error rate and, therefore, the receiver sensitivity of the receiver.

In accordance with yet an additional feature of the invention, preferably, the transmission filter is additionally configured as a converging lens so that received radiation can be projected even better onto the receiver.

In accordance with again another feature of the invention, the light emitted from the transmitter is one of the group consisting of green light and red light, the light received by the receiver is one of the group consisting of red light and green light, and the transmission filter is one of the group consisting of a red filter and a green filter.

If the transmission and reception configuration uses light signals of the same wavelength for the bi-directional data transmission, then it is necessary to ensure that no, or only very little, direct light or scattered light of the transmitter crosstalks to the receiver. To that end, in accordance with again a further feature of the invention, an attenuation filter, which is intended to keep the light of the transmission diode away from the receiver, is preferably assigned to or associated with the receiver.

In accordance with again an added feature of the invention, the transmitter transmits an optical signal including light at a given wavelength, the receiver receives light at the given wavelength, and the attenuation filter protects the receiver from the light emitted from the transmitter.

In accordance with again an additional feature of the invention, the attenuation filter is preferably configured as a ring, which is non-transparent for the transmission wavelength and is disposed around the receiver. The ring preferably extends over a particular height in the direction of the coupling lens and, hence, constitutes, so to speak, a protective wall around the receiver. The configuration prevents, in particular, direct lateral crosstalk from the transmitter to the receiver.

In accordance with still another feature of the invention, the ring extends from the coupling lens.

In accordance with still a further feature of the invention, the ring extends towards the receiver.

Provision may also be made for the ring to be thickened in subregions, in particular, in order to suppress reflected powers from the front reflection or from the end surface of the aspherical coupling lens.

The ring that is non-transparent for the transmission wavelength is preferably connected to a transparent transmission filter that is disposed on the receiver. The transparent filter is preferably configured as a lens that is located in front of the receiver.

Directly next to the receiver, in accordance with a concomitant feature of the invention, a second receiver, preferably having the same construction and that is covered with an optically non-transparent layer, is disposed on the substrate or formed therein. Preferably, the second receiver is disposed directly next to the receiver on the substrate, the receiver and the second receiver each transmit output signals, and an evaluation circuit is connected to the receiver and to the second receiver, the evaluation circuit filtering out noise signals by taking a difference between respective ones of the output signals. In such a case, an evaluation circuit that very greatly reduces, or ideally eliminates, the electrical crosstalk by taking the difference between the respective signals, is assigned to the two receivers. The basis of the differential evaluation is that the second receiver exclusively detects noise radiation.

Other features that are considered as characteristic for the invention are set forth in the appended claims.

Although the invention is illustrated and described herein as embodied in a transmission and reception configuration for bi-directional optical data transmission, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 3 is a fragmentary, cross-sectional view of a fourth embodiment of the transmission and receiver of FIG. 1 with the transmission and reception configuration having a bifocal coupling lens;

FIG. 4 is a fragmentary, cross-sectional view of a fifth exemplary embodiment of the transmission and receiver of FIG. 1 with an alternative configuration of a bifocal coupling lens.

DESCRIPTION OF THE PREFERRED EMBODIMENTS

Figure 1:
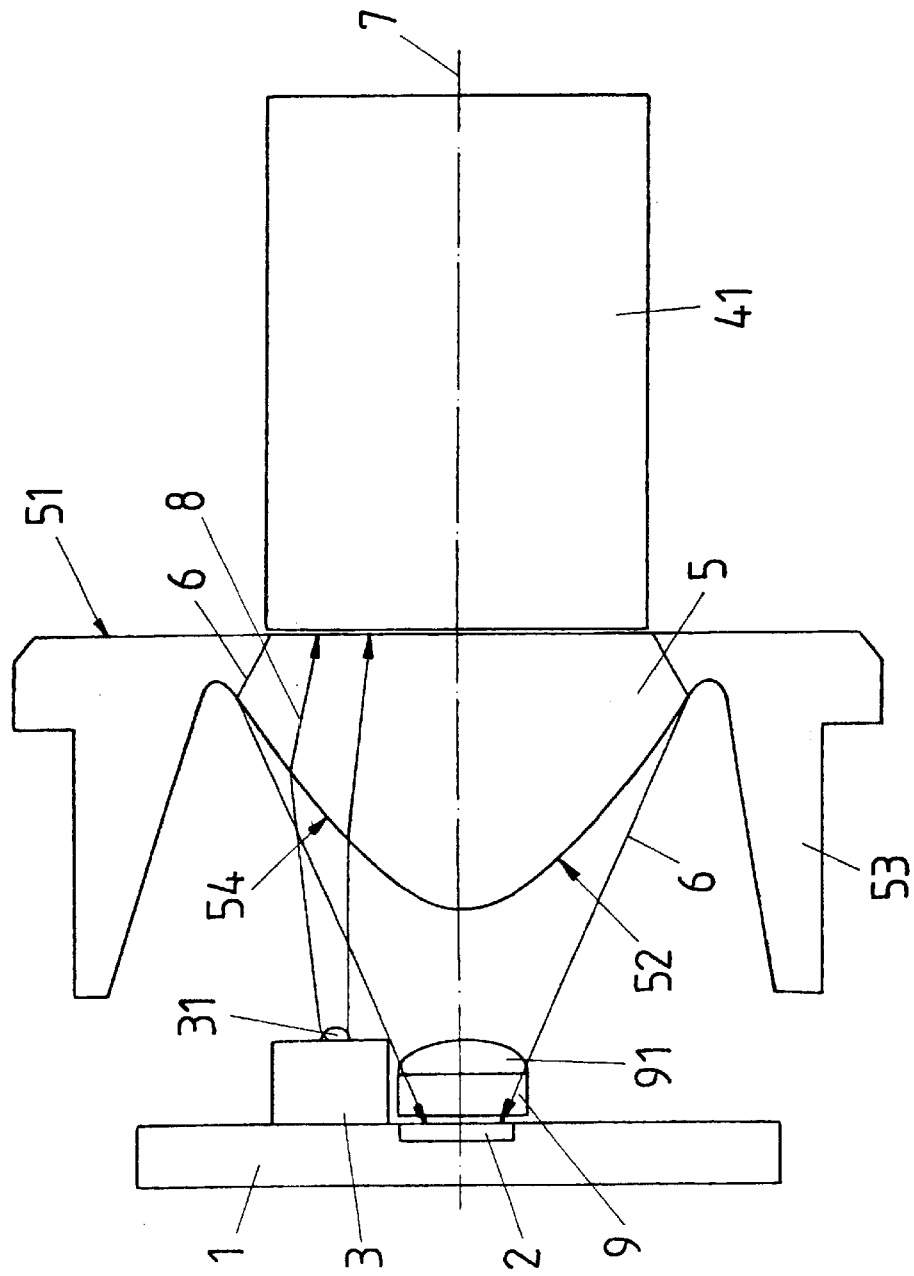
FIG. 1 is a fragmentary, cross-sectional view through a first exemplary embodiment of a transmission and reception configuration according to the invention.

Referring now to the figures of the drawings in detail and first, particularly to FIG. 1 thereof, there is shown the basic structure of the present transmission and reception configuration. In a substrate 1, preferably of silicon, a photodiode 2 that serves as a receiver is produced in a conventional manner. Next to the photodiode 2, a transmitter 3 is disposed on the substrate 1, the transmitter 3 being, for example, a light-emitting diode (LED, RCLED (Resonant-Cavity LED)) or a laser diode (in particular a vertical cavity surface emitting laser ("VCSEL") diode). Alternatively, the photodiode 2 may be formed on a separate chip and disposed on the substrate 1.

A coupling lens 5 is provided for coupling the photodiode 2 and the transmitter 3 to the fiber core 41 of an optical fiber (not further shown). The optical fiber is, in the exemplary embodiment that is represented, a plastic/polymer fiber (POF fiber) having a POF fiber core 41 with, for example, a diameter of 980 μm.

The coupling lens 5 is of a material that is transparent for the relevant wavelengths. It is, for example, a glass or plastic lens. On a side 51 facing away from the substrate 1, the coupling lens 5 is ground flat so that the POF fiber core 41 can couple directly to the flat surface 51. In principle, however, provision may also be made to fit further beam-shaping elements or intermediate pieces between the coupling lens 5 and the POF fiber core.

On a side 52 facing the substrate 1, the coupling lens 5 is aspherical, i.e., it has a shape that deviates from circular. As such, divergent light 6 emerging from the fiber core 41 is deflected such that it is incident exclusively on the photodiode 2, while essentially no radiation is deflected onto the transmitter 3.

At a circumference or edge, the coupling lens 5 has aligning and fitting structures 53 that permit passive coupling of the coupling lens 5 to a non-illustrated casing that encloses the transmission and reception configuration.

The coupling lens 5 is preferably antireflection-coated to minimize reflections from the coupling lens.

The geometrical configuration of the individual elements is such that the optical axis 7 of the fiber core 41 coincides with the optical axis of the coupling lens 5 and the axis of the photodiode 2, so that these elements are centrally aligned with one another. Accordingly, the transmitter 3 is located off-center next to the photodiode 2 on the substrate 1. The size proportions are such that the diameter of the photodiode 2 is less than half the fiber-core diameter. With a correspondingly small photodiode cross-sectional area, the transmitter 3 is still inside the projected cross-sectional area of the fiber core, as can also be seen with FIG. 2.

A micro-lens 31, which is likewise configured as a spherical lens, is located directly on the transmitter 3. The micro-lens 31 focuses the forward-emitted light of the transmitter 3 such that the light of the transmitter 3 is incident on a small edge region 54 of the coupling lens 5. From the edge region 54, the light emitted by the transmitter 3 is injected into the fiber core 41 as indicated by the arrows 8.

The fiber is preferably a multimode fiber. A transmission filter 9 that has a curved surface 91 and, therefore, also acts as a converging lens, is located on the photodiode 2. The transmission filter 9 is transparent only for a particular wavelength to be detected, which is extracted from the fiber core 41. Alternatively, it filters out at least the wavelength of the transmitter 3.

The transmission filter 9 prevents optical crosstalk of signals emitted by the transmitter 3 onto the photodiode 2. Hence, the transmission filter substantially filters out scattered light of the transmitter at the front side and back side of the coupling lens 5 or reflections at the fiber couplings or from the end of the transmission path. Possible direct crosstalk is also prevented.

The transmitter 3 emits, for example, red light. Conversely, the photodiode receives green light, which is emitted by a green-light transmitter disposed at the other end of the bi-directional transmission path. The aspherical coupling lens 5 is embodied such that, at the end of the fiber transmission path, the received light is projected optimally onto the photodiode 2. By the micro-lens 31, which focuses the emitted light of the transmission source directly and without immediately above the emission surface of the transmitter 3, all of the emitted light is projected onto as small as possible a part of the coupling lens 4.

Figure 2C:
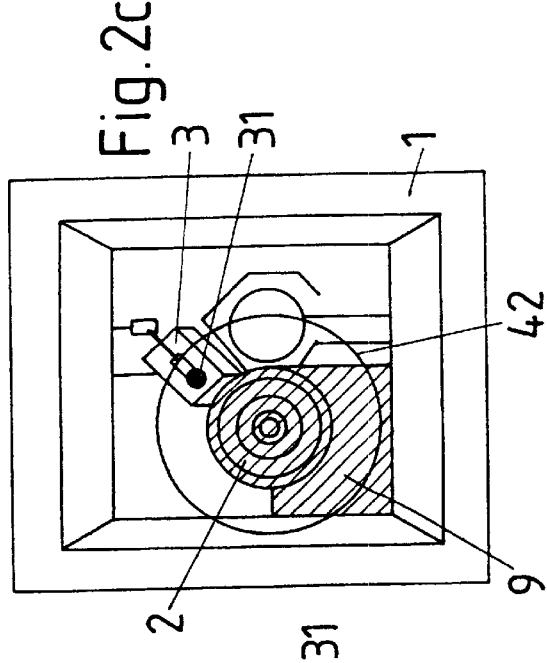
FIG. 2c is an elevational plan view of the counterpart of a transmission and reception configuration of FIG. 2b in a bi-directional transmission path.
Figure 2D:
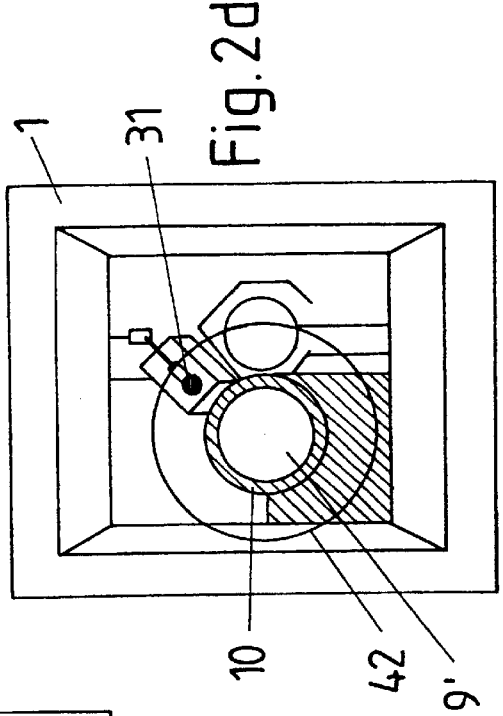
FIG. 2d is an elevational plan view of a third exemplary embodiment of the transmission and reception unit of FIG. 1 that can be employed when the same wavelengths are used for the transmission and reception paths with one of the receivers being enclosed by a non-transparent ring.
Figure 2B:
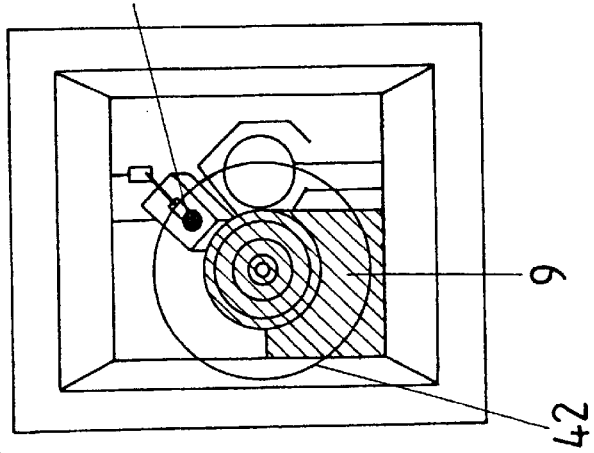
FIG. 2b is an elevational plan view of the embodiment of FIG. 2a with one of the receivers being covered with a transmission filter.
Figure 2A:
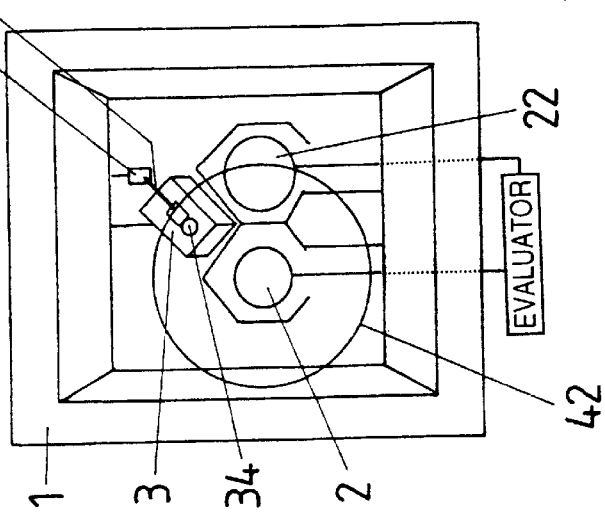
FIG. 2a is an elevational plan view of a second exemplary embodiment of the transmission and reception configuration of FIG. 1 with one transmitter and two receivers.

FIG. 2a shows the structure of a bi-directional transmission and receiver in front view. The transmission filter is not yet represented. The substrate 1 is an anisotropically etched Si substrate, in which two photodiodes 2, 22 are formed. The right-hand photodiode 22 is covered within an optically non-transparent layer. Through evaluation of the difference between the signals detected by the two photodiodes 2, 22 with an evaluation circuit 23, noise signals due to undesired noise radiation can be identified and removed from the useful signal by using a differential circuit. Hence, the electrical crosstalk is reduced very greatly.

The optical transmitter 3 is disposed in an oblique configuration on the surface of the substrate 1. The POF fiber core 41 according to FIG. 1 has a diameter such that the projected fiber-core end surface 42 has a size so that both the one photodiode 2 and the optical transmitter 3 lie inside the projected end surface 42.

By configuring the optical transmission source 3 obliquely on the substrate 1, the space between the two photodiodes 2, 22 is utilized optimally and the optical transmitter 3 is incorporated as deeply as possible into the projected fiber-core end surface 42. FIG. 2a shows the optical transmitter still without a micro-lens. The transmitter 3 is connected, in a conventional manner, through power leads 32 and a color wire 33, an optically active surface 34 emitting a light signal that is modulated in accordance with a data signal to be transmitted.

According to FIG. 2b, an aspherical micro-lens 31 is assigned to the optically active surface 34 of the transmitter 3. At the same time, a transmission filter 9 is located above and beside the one photodiode 2. In the exemplary embodiment that is represented, the transmitter 3 emits red light while the receiver 2 detects green light, and the transmission filter is correspondingly constructed as a green filter. The green transmission filter 9 suppresses optical crosstalk, as explained with reference to FIG. 1.

The exemplary embodiment of FIG. 2c corresponds to the exemplary embodiment of FIG. 2b, the associated transceiver disposed on the other side of a bi-directional transmission path being represented, the transceiver emitting green light and receiving red light, as indicated by the different shadings.

FIG. 2d shows a possible configuration of the transmission and reception configuration for the case in which only one wavelength is used for the bi-directional data transmission. The transmission filter 9' is configured merely as a transparent converging lens and, alternatively, may be omitted completely. To prevent optical crosstalk directly from the transmitter 3 onto the photodiode 2, a protruding light-absorbing attenuation ring 10 that encloses the photodiode 2 is disposed on the substrate 1. The configuration prevents, in particular, direct crosstalk from the transmitter 3 onto the receiver 2.

FIG. 3 shows another exemplary embodiment of the invention, in which the aspherical lens 5' is bifocally configured. A secondary lens 55' is formed, in the coupling lens 5', in a region where the radiation emitted by the transmitter 3, or the micro-lens 31, is incident on the coupling lens 5'. The secondary lens 55' injects, in a small region, the transmission powers of the transmitter 3 maximally into the fiber core 41. In the exemplary embodiment of FIG. 3, the secondary lens 55' is disposed on the inside. However, the placement may be unfavorable in the case of a broadening transmission beam because the lens becomes commensurately larger as the transmission beam broadens and reception power is, therefore, increasingly lost.

FIG. 4 shows an alternative configuration of an auxiliary lens 55", in which the auxiliary lens 55" is embodied externally on the surface of the aspherical coupling lens 5". In other regards, there are no differences from the exemplary embodiments of FIG. 3 or FIG. 1.

Figure 5:
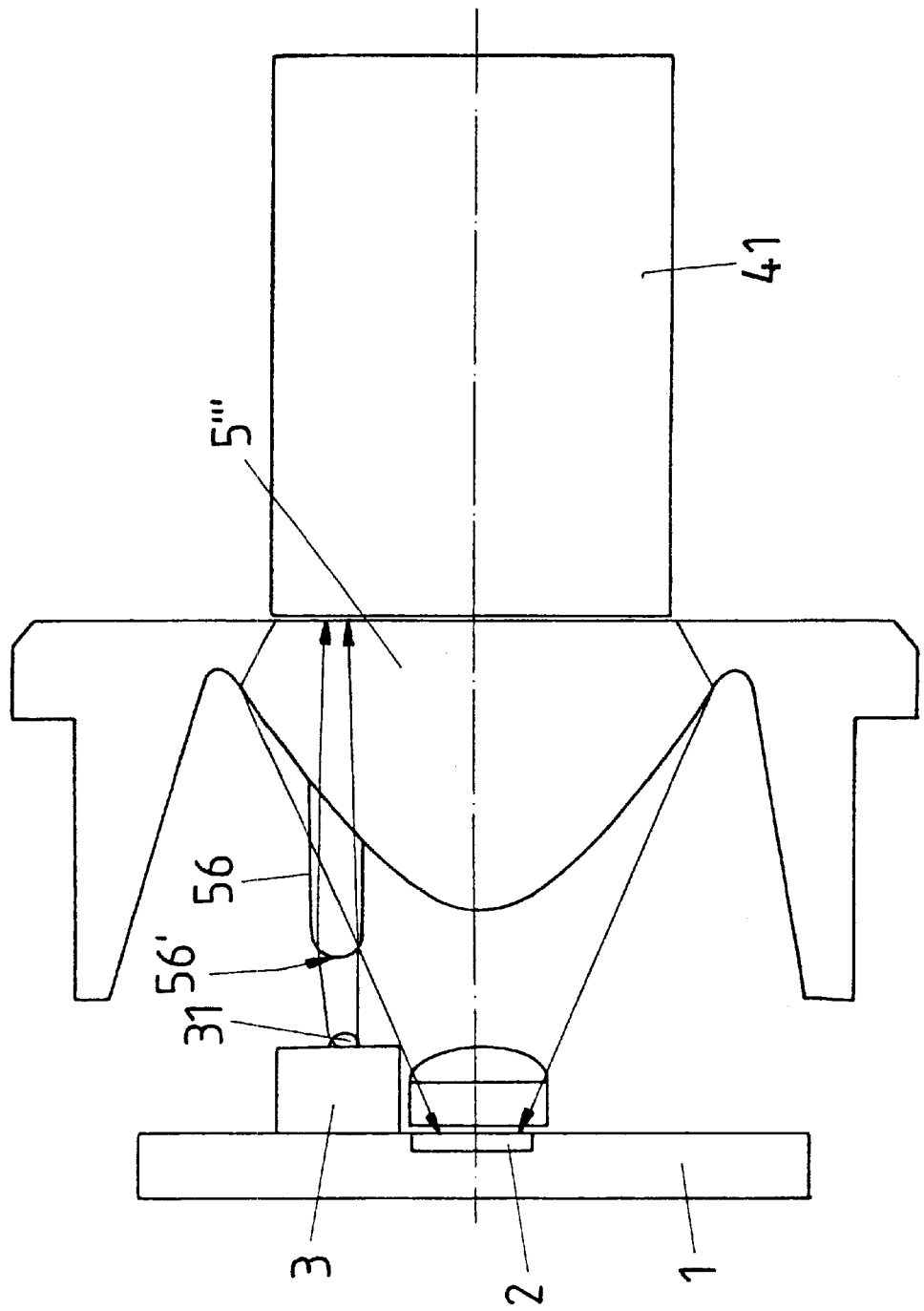
FIG. 5 is a fragmentary, cross-sectional view of a sixth exemplary embodiment of the transmission and reception configuration of FIG. 1 with a coupling lens forming a waveguide appendage.

FIG. 5 shows an exemplary embodiment of a transmission and receiver, or transceiver, in which light is injected from the transmitter 3 into the coupling lens 5'" and onward into the fiber core 41 through a short waveguide appendage 56 that extends from the surface of the coupling lens 5'" in the direction of the micro-lens 31 of the transmitter 3. The waveguide appendage 56 is embodied with a lens 56' on its end.

Because of the short distance between the micro-lens 31 and the waveguide appendage 56, the coupling losses can be kept very small. Alongside the better coupling efficiency, however, the requirements for coupling accuracy also increase. Therefore, the transmitter 3 should be mounted on the silicon substrate 1 at a distance that is as precise as possible from the optical axis 7 and with an accurately set angle (cf. FIG. 2a). Further, the coupling lens should have clock-face marks so as to permit coupling that is as accurate as possible through the use of image-enhancing methods.

I claim:

1. A transmission and reception configuration for bi-directional optical data transmission, comprising:
    a substrate;
    a transmitter for emitting light, said transmitter disposed on said substrate;
    a receiver for receiving light, said receiver disposed next to said transmitter on said substrate;
    a coupling lens for projecting light delivered from an optical waveguide onto said receiver, said coupling lens optically coupled to said receiver and having an edge region, said coupling lens having a planar rear side, said planar rear side of said coupling lens being disposed directly on a front side of the optical waveguide; and
    a micro-lens focusing forward-emitted light of said transmitter and projecting the light onto said edge region, said micro-lens connected to said transmitter, the light being injected from said edge region into the optical waveguide.

2. The configuration according to claim 1, wherein said receiver is adjacent said transmitter on said substrate.

3. The configuration according to claim 1, wherein:
    the optical waveguide has a fiber core with a fiber core diameter; and
    said receiver has a diameter less than the fiber core diameter.

4. The configuration according to claim 3, wherein said diameter of said receiver is less than or equal to half the fiber core diameter.

5. A transmission and reception configuration for bi-directional optical data transmission, comprising:
    a substrate;
    a transmitter for emitting light, said transmitter disposed on said substrate;
    a receiver for receiving light, said receiver disposed next to said transmitter on said substrate;
    a coupling lens for projecting light delivered from an optical waveguide onto said receiver, said coupling lens optically coupled to said receiver and having an edge region, the optical waveguide having a fiber core with a fiber core diameter, said receiver having a diameter less than the fiber core diameter; and
    a micro-lens focusing forward-emitted light of said transmitter and projecting the light onto said edge region, said micro-lens connected to said transmitter, the light being injected from said edge region into the optical waveguide;
    the fiber core of the optical waveguide having a projected cross-sectional area, said transmitter being disposed directly next to said receiver, and said transmitter and said receiver being disposed within the projected cross-sectional area of the fiber core.

6. The configuration according to claim 1, wherein said coupling lens is an aspherical lens.

7. The configuration according to claim 1, wherein said micro-lens is an aspherical lens.

8. A transmission and reception configuration for bi-directional optical data transmission, comprising:
    a substrate;
    a transmitter for emitting light, said transmitter disposed on said substrate, said transmitter having an injection region;
    a receiver for receiving light, said receiver disposed next to said transmitter on said substrate;
    a coupling lens for projecting light delivered from an optical waveguide onto said receiver, said coupling lens being a bifocal lens, said bifocal lens optically coupled to said receiver and having an edge region, a portion of said bifocal lens forming a secondary lens in said injection region of said transmitter; and
    a micro-lens focusing forward-emitted light of said transmitter and projecting the light onto said edge region, said micro-lens connected to said transmitter, the light being injected from said edge region into the optical waveguide.

9. The configuration according to claim 1, wherein said coupling lens forms a short waveguide appendage extending in a direction of said transmitter.

10. The configuration according to claim 9, wherein said waveguide appendage extends toward said transmitter.

11. The configuration according to claim 9, wherein said waveguide appendage has an end facing said transmitter and a lens on said end.

12. The configuration according to claim 1, including a transmission filter disposed at said receiver, said transmission filter being non-transparent to light of a given wavelength.

13. The configuration according to claim 12, wherein said transmission filter is disposed upstream of said receiver with respect to a receiving direction of said receiver.

14. The configuration according to claim 12, wherein said transmission filter is disposed in front of said receiver.

15. A transmission and reception configuration for bi-directional optical data transmission, comprising:
a substrate;
a transmitter for emitting light, said transmitter disposed on said substrate;
a receiver for receiving light, said receiver disposed next to said transmitter on said substrate;
a coupling lens for projecting light delivered from an optical waveguide onto said receiver, said coupling lens optically coupled to said receiver and having an edge region;
a micro-lens focusing forward-emitted light of said transmitter and projecting the light onto said edge region, said micro-lens connected to said transmitter, the light being injected from said edge region into the optical waveguide; and
a transmission filter disposed at said receiver, said transmission filter being non-transparent to light of a given wavelength, said transmission filter also being a converging lens.

16. The configuration according to claim 12, wherein said transmission filter has a converging lens.

17. The configuration according to claim 12, wherein:
the light emitted from said transmitter is one of the group consisting of green light and red light;
the light received by said receiver is one of the group consisting of red light and green light; and
said transmission filter is one of the group consisting of a red filter and a green filter.

18. The configuration according to claim 1, including an attenuation filter protecting said receiver from light emitted from said transmitter, said attenuation filter being associated with said receiver.

19. The configuration according to claim 18, wherein:
said transmitter transmits light including light at a given wavelength;
said receiver receives light at the given wavelength; and
said attenuation filter protects said receiver from the light emitted from said transmitter.

20. A transmission and reception configuration for bi-directional optical data transmission, comprising:
a substrate;
a transmitter for emitting light, said transmitter disposed on said substrate;
a receiver for receiving light, said receiver disposed next to said transmitter on said substrate;
a coupling lens for projecting light delivered from an optical waveguide onto said receiver, said coupling lens optically coupled to said receiver and having an edge region;
a micro-lens focusing forward-emitted light of said transmitter and projecting the light onto said edge region, said micro-lens connected to said transmitter, the light being injected from said edge region into the optical waveguide; and
an attenuation filter protecting said receiver from light emitted from said transmitter, said attenuation filter being associated with said receiver, said attenuation filter being a ring non-transparent to a given light transmission wavelength and disposed around said receiver.

21. The configuration according to claim 20, wherein said ring extends from said coupling lens.

22. The configuration according to claim 20, wherein said ring extends towards said receiver.

23. The configuration according to claim 20, wherein:
a transparent lens is disposed on said receiver; and
said ring is connected to said transparent lens.

24. A transmission and reception configuration for bi-directional optical data transmission, comprising:
a substrate;
a transmitter for emitting light, said transmitter disposed on said substrate;
a first receiver for receiving light, said receiver disposed next to said transmitter on said substrate;
a coupling lens for projecting light delivered from an optical waveguide onto said receiver, said coupling lens optically coupled to said receiver and having an edge region;
a micro-lens focusing forward-emitted light of said transmitter and projecting the light onto said edge region, said micro-lens connected to said transmitter, the light being injected from said edge region into the optical waveguide;
a second receiver covered with an optically non-transparent layer, said second receiver being disposed directly next to said receiver on said substrate, said first receiver and said second receiver each transmitting output signals; and
an evaluation circuit connected to said first receiver and to said second receiver, said evaluation circuit filtering out noise signals by taking a difference between respective ones of said output signals.

25. A transmission and reception configuration for bi-directional optical data transmission through plastic-fiber optical waveguides, comprising:
a substrate;
a transmitter for emitting light, said transmitter disposed on said substrate;
a receiver for receiving light, said receiver disposed next to said transmitter on said substrate;
a coupling lens for projecting light delivered from an optical waveguide onto said receiver, said coupling lens optically coupled to said receiver and having an edge, region said coupling lens having a planar rear side, said planar rear side of said coupling lens being disposed directly on a front side of the optical waveguide; and
a micro-lens focusing forward-emitted light of said transmitter and projecting the light onto said edge region, said micro-lens connected to said transmitter, the light being injected from said edge region into the optical waveguide.

26. A transmission and reception configuration for bi-directional optical data transmission, comprising:
a substrate;
a transmitter for emitting light, said transmitter disposed on said substrate;
a receiver for receiving light, said receiver disposed next to said transmitter on said substrate;
a coupling lens for projecting light delivered from an optical waveguide onto said receiver, said coupling lens optically coupled to said receiver and having an edge region, said coupling lens forming a short waveguide appendage extending from said edge region in a direction of said transmitter and having a diameter smaller than a diameter of said coupling lens; and a micro-lens focusing forward-emitted light of said transmitter and projecting the light onto said edge region, said micro-lens connected to said transmitter, the light being injected from said edge region into the optical waveguide.

* * * * *